UNITED STATES PATENT OFFICE.

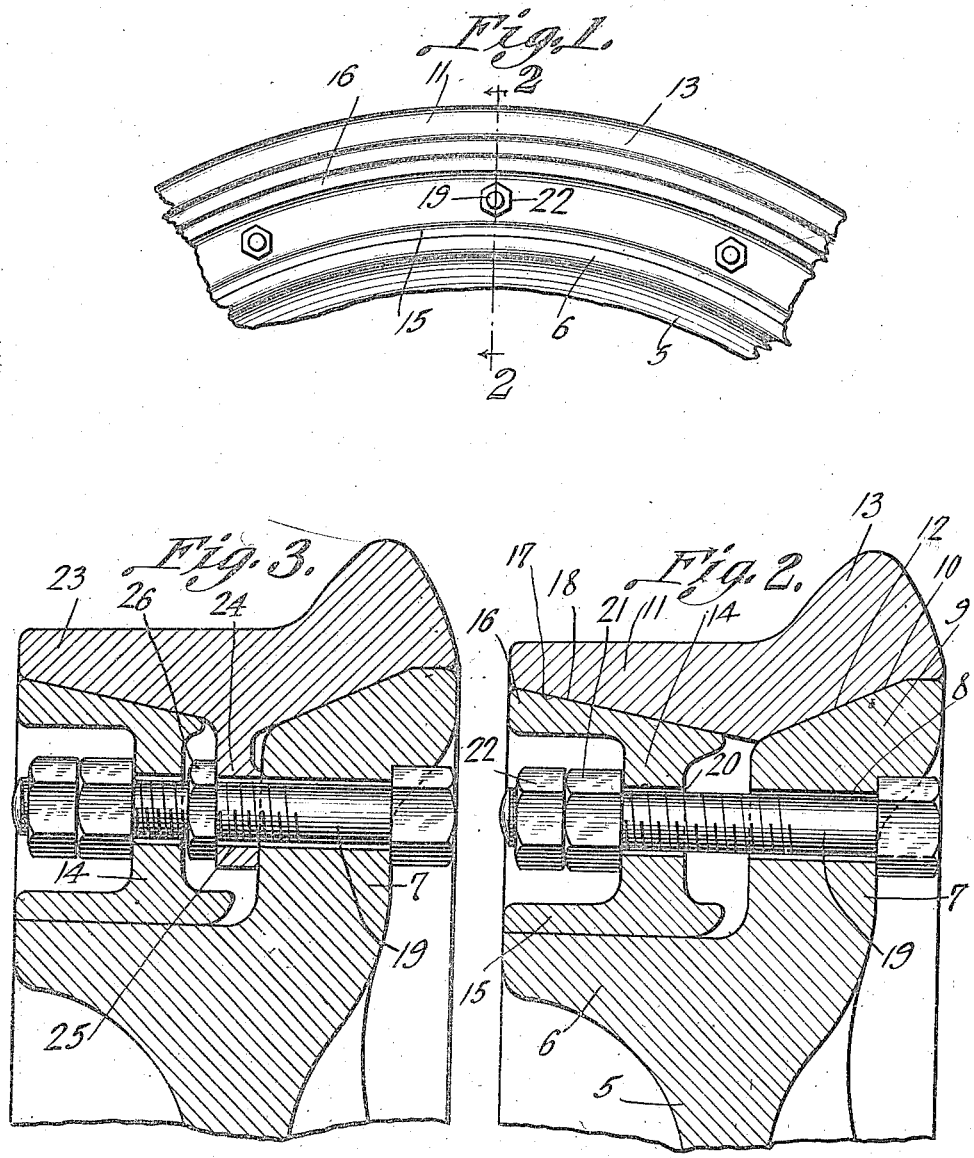

WILLIAM W. FULLER, OF CHARLESTON, SOUTH CAROLINA.

CAR-WHEEL.

1,269,417.   Specification of Letters Patent.   Patented June 11, 1918.

Application filed January 16, 1918. Serial No. 212,109.

*To all whom it may concern:*

Be it known that I, WILLIAM W. FULLER, a citizen of the United States, and a resident of Charleston, in the county of Charleston and State of South Carolina, have invented new and useful Improvements in Car-Wheels, of which the following is a specification.

This invention relates to car wheels and has particular reference to that class of car wheels employing a supplemental rim or tread.

An important object of the invention is to provide in a device of the above mentioned character a means whereby the supplemental rim may be easily placed upon the wheel and securely locked in position thereupon.

A further object of the invention is to provide in a device of the above mentioned character a means whereby the rim may be readily unlocked and quickly removed or detached from the wheel.

A further object of the invention is to provide in a device of the above mentioned character a locking mechanism for the supplemental rim or tread which under varying conditions may be maintained at all times in a locked position.

A further object of the invention is to provide a device of the above mentioned character which is simple in construction, cheap to manufacture, strong, durable, and reliable in operation.

Other objects and advantages of the invention will be apparent from the following description.

In the drawings forming a part of this specification and in which like numerals are employed to designate like parts throughout the same, Figure 1 is a fragmental view showing in elevation a portion of the device embodying my invention, Fig. 2 is a cross sectional view of Fig. 1 taken on the line 2—2, and, Fig. 3 is a cross sectional view of a car wheel embodying a modified form of the invention.

In the drawings the numeral 5 indicates the main body of a car wheel provided relatively near its periphery with a flange 6 disposed at substantially a right-angle to the main body of the car wheel 5 as shown. The main body 5 of the car wheel is provided also with an upstanding flange 7 having a plurality of transversely disposed openings 8 provided therein. This upstanding flange 7 is slightly enlarged as shown at 9, relatively near its peripheral edge and is provided with an inclined face 10. The foregoing is common to both forms of my invention.

Upon the inclined face 10 there is disposed a supplemental rim 11 provided relatively near one edge thereof with an inclined face 12 adapted to engage the inclined face 10 as shown. This supplemental rim or tread carries an enlarged portion 13 forming a flange similar to that employed in the conventional form of car wheel structure. An annular ring 14 is carried between the flange 6 and the supplemental rim or tread 11 and is provided at one edge thereof with a flange 15 adapted to engage the flange 6 as shown, while the other edge is provided with a flange 16 having a beveled face 17 adapted to engage an inner beveled face 18 carried by the supplemental rim 11 as shown. A bolt 19 is passed through the opening 8 provided by the upstanding flange 7 and an opening 20 provided by the annular ring 14 and is held in position as shown by means of a nut 21 carried thereby and engaging the outer face of the annular ring 14. As the means for locking the nut 21 in position with respect to the bolt 19 there is provided a second nut 22 carried by the bolt 19 and adapted to engage the nut 21 as shown.

In considering Fig. 3 wherein is shown a modified form of my invention, the numeral 23 indicates a supplemental rim or tread identical with that indicated by the numeral 11 shown in Fig. 2 except, however, I have provided a depending flange 24 provided with a plurality of openings 25 adapted to receive the bolts 19. This depending flange 24 is held in engagement with the upstanding flange 7 by means of a nut 26 carried by the bolt 19 and engaging the flange 24 as shown. It will be noted that this flange 24 together with the nut 26 is carried between the annular ring 14 and the upstanding flange 7.

In assembling the preferred form of my invention the supplemental rim 11 is placed upon the upstanding flange 7 in the position shown. The annular ring 14 is then placed in the position shown also in Fig. 3, whereupon the bolt 19 is inserted into the openings 8 and 20, which bolt together with the nuts 21 and 22 serve as a means for retaining the annular ring 14 in the position shown. It is to be understood that as the nut 21 is run down upon the screw threaded bolt 19 the annular ring 14 is carried in the direction of travel of the same whereupon the inclined face 17 of the annular ring 14 co-acts with the inclined face 18 of the tread 11 thereby gradually tightening the rim or tread 11, in the position desired. It will be further understood that the ring 14 serves not only as a means for retaining the supplemental rim or tread 11 in position but as a means whereby any wear or loosening between the supplemental rim or tread 11 and the annular ring 14 may be compensated.

The assembling of the modified form of my invention is substantially the same as that of the preferred form which has been hereinbefore described and which will be readily understood after having considered the specification together with the disclosure relative to the preferred form of my invention.

It is to be understood that various changes in the shape, size and arrangement of parts may be resorted to without departing from the spirit of my invention or the scope of the subjoined claim.

Having thus described my invention, what I claim as new and desire to secure and protect by Letters Patent of the United States, is:

A device of the character described comprising a main body provided with a flange disposed substantially at right angles thereto, a second flange carried by the main body and provided with an enlarged head having an inclined face, an annular ring disposed upon the first mentioned flange said annular ring comprising a pair of oppositely disposed flanges, one of said flanges having engagement with the first mentioned flange, the other of said flanges being provided with an inclined face, a supplemental rim disposed upon the second mentioned flange and provided with inclined faces one of which is adapted to engage the inclined face carried by the second named flange the other of which is adapted to engage the inclined face carried by the annular ring, a depending flange secured to said supplemental rim, said depending flange being confined between the second named flange and said annular ring, a bolt passed through said annular ring, said depending flange, and the second named flange, said bolt being adapted to retain the annular ring in engagement with the first mentioned flange and the supplemental rim, and means for retaining said depending flange in engagement with the second named flange.

WILLIAM W. FULLER.